United States Patent Office 3,480,574
Patented Nov. 25, 1969

3,480,574
NON-AQUEOUS SOLUTION OF A BUTYLATED MELAMINE - FORMALDEHYDE CONDENSATE AND A MALEIC ANHYDRIDE ADDUCT WITH AN OLEIC ACID ESTER OF ALLYL ALCOHOL-STYRENE COPOLYMER
Frank J. Hahn, Wilbraham, and Robert A. Isaksen, East Longmeadow, Mass., assignors to Monsanto Company, St. Louis, Mo., a corporation of Delaware
No Drawing. Filed Jan. 3, 1966, Ser. No. 517,945
Int. Cl. C08f 43/06, 27/12
U.S. Cl. 260—21                                    1 Claim

ABSTRACT OF THE DISCLOSURE

Disclosed herein are surface coating compositions based upon non-aqueous solutions of
(A) an adduct of
   (1) an alpha, beta-ethylenically unsaturated carboxlic compound and
   (2) an ester of
     (a) at least one unsaturated acid and
     (b) a copolymer of a styrene monomer and a allyl alcohol comonomer and
(B) at least 1 alkylated melamine-aldehyde condensate.

---

This invention relates to novel surface coating compositions, the cured form thereof and to processes for their manufacture. More particularly, it relates to solutions and to cured products of (a) aminoplast resins and (b) adducts of (1) alpha, beta ethylenically unsaturated carboxylic compounds and (2) an ester of (a) at least one unsaturated acid and (b) a copolymer of a vinyl aromatic monomer and an allyl alcohol monomer.

It is an object of this invention to provide novel surface coating compositions and methods for their preparation.

Another object is the provision of novel surface coating compositions possessed of both good flexibility and high chemical resistance.

A further object is the provision of cured thermoset resins of good flexibility and high chemical resistance.

These and other objects are attained through the provision of a non-aqueous solution of:

(A) An adduct of
   (1) an alpha, beta ethylenically unsaturated carboxylic compound and
   (2) an ester of
     (a) at least one unsaturated acid as hereinafter set forth, and
     (b) a copolymer of a styrene monomer and an allyl alcohol monomer, each as hereinafter set forth, and
(B) at least one alkylated melamine-aldehyde condensate as hereinafter set forth.

The following examples are presented in illustration of this invention and are not intended as limitations thereof. Where parts are mentioned, they are parts by weight.

EXAMPLE I

This example illustrates the formulation of a surface coating composition comprising Resimene 891, a 50% solids solution of a butylated melamine-formaldehyde condensate in a 1:1 xylene/butanol mixture, and a maleinized adduct of an oleic acid/lauric acid ester of a styrene/allyl alcohol copolymer.

Part A

Preparation of ester of styrene/allyl alcohol copolymer: Charge 250 grams of oleic acid, 180 grams of lauric acid, 490 grams of a styrene/allyl alcohol copolymer containing about 5.8 weight percent of hydroxyl groups and 500 ml. of xylol to a reaction kettle, equipped with a stirrer and a trap-condenser-azotrope set-up, according to the following charge and heat cycle schedule.

| Minutes: | Temp., ° C. | Comments |
|---|---|---|
| 0 | 25 | Charge copolymer, oleic acid, xylol. |
| 35 | 149 | Azeotrope starts. |
| 120 | 218 | 121 ml. water over. |
| 160 | 222 | 197 ml. water over charge lauric acid. |
| 265 | 180 | Azeotrope resumes. |
| 420 | 240 | 256 ml. water over. |
| 500 | 246 | 297 ml. water over, finis. |

A total of about 10.5 ml. of xylol is removed with the water. The resulting product contains about 92.5% esterified solids by weight, having an acid equivalent of about 0.263 meq./gram.

Part B

Preparation of maleinized adduct of the ester of Part A of this Example I: Charge 835 grams of the product of Part A of this Example I and 41.0 grams of maleic anhydride to a two-liter flask equipped with a stirrer and reflux condenser. Heat according to the following schedule:

| Minutes: | Temp., ° C. | Comments |
|---|---|---|
| 0 | 25 | Charge ester and maleic anhydride. |
| 45 | 218 | Starts refluxing. |
| 70 | 228 | |
| 120 | 237 | |
| 255 | 255 | Finis. |

The reaction mixture is cooled to about 100° C. and stripped under vacuum of about 26 in. of Hg to remove unreacted maleic anhydride together with most of the xylol. The resulting 97.6% solids solution shown by analysis to have about 64.2% of the maleic anhydride initially charged is adducted to the ester; the adduct containing about 2.6% maleic solids by weight based upon the total solids.

Part C

Preparation of a formulation of Resimene 891, a 50% solids solution of a butylated melamine-formaldehyde condensate in a 1:1 xylene/butanol mixture, and the adduct of Part B of this Example I. Prepare two formulations as follows:

| | (a) | (b) |
|---|---|---|
| Resimene 891, grams | 25.0 | 25.0 |
| Adduct of Part B, Ex. I, grams | 43.7 | 43.7 |
| Catalyst,* grams | | 0.05 |
| Xylol, grams | 5.1 | 5.1 |

*Catalyst is butyl acid phosphate.

Both formulations are individually cast on a series of stainless steel plates and on glass plates in films of about 0.006 inch thickness, air dried for 15 minutes and then dried in a hot air oven for 30 minutes at 350° F. with the following results:

| | (a) | (b) |
|---|---|---|
| Adhesion | Excellent | Excellent. |
| Flexibility | do | Do. |
| Chemical resistance (xylol) | Fair | Do. |
| Cross-linking | Slight | Do. |
| Clarity | Clear | Clear. |
| Gloss | Very high | Very high. |

As can be seen from the above results, these formulations provide good flexible, clear and glossy surface coatings with even the uncatalyzed formulation exhibiting some cross-linking and chemical resistance despite the low degree of maleic adduction of the ester (i.e., 2.6% by weight on the adducted esterified copolymer solids).

The following Examples II–IV illustrate the effect of varying degrees of maleic adduction, i.e., 11.4%, 6.8%, and 3.8%, respectively, of an oleic acid ester of a styrene/allyl alcohol copolymer at varying levels of alkylated melamine-formaldehyde condensate modification and with and without pigmentation.

EXAMPLE II

Part A

Preparation of oleic ester of styrene/allyl alcohol copolymer: Charge 6720 grams of oleic acid, 6480 grams of a styrene/allyl alcohol copolymer containing about 5.8 weight percent of hydroxyl groups and 400 grams of xylol to a reaction kettle equipped with a stirrer and a trap-condenser-azeotrope set-up. The reaction mixture is heated according to the following schedule:

| Temp., °C. | Comments |
|---|---|
| Minutes: | |
| 0 | 27 All ingredients charged. |
| 90 | 155 Azeotrope start. |
| 120 | 183 132 ml. water over. |
| 170 | 228 336 ml. water over. |
| 235 | 254 416 ml. water over. |
| 500 | 260 460 ml. water over, finis. |

Cool to about room temperature. The resulting product contains about 94.6% esterified solids by weight having an acid equivalent of about 0.294 meq./gram.

Part B

Preparation of maleinized adduct of the oleic ester of Part A of this Example II: Charge 1080 grams of the product of Part A of this Example II, 130 grams of maleic anhydride and 11.0 grams of a 10% by weight solution of iodine in xylol to a two-liter flask, equipped with a stirrer and a reflux condenser, according to the following charge and heat cycle schedule:

| Temp., °C. | Comments |
|---|---|
| Minutes: | |
| 0 | 27 Charge ester and maleic anhydride. |
| 13 | 63 Charge iodine dispersion. |
| 65 | 210 Refluxing. |
| 195 | 227 |
| 445 | 222 Finis. |

The reaction mixture is cooled to about 200° C. and stripped under vacuum of about 26 in. of Hg to remove unreacted maleic anhydride together with most of the xylol. The resulting 97.8% solids solution is then adjusted with xylol to about 80% solids. Analysis shows that the adduct contains about 11.4% by weight of actually adducted maleic anhydride based upon total solids, and has a free acid content of about 0.261 meq./gram.

Part C

Preparation of clear formulations of Resimene 891, a 50% solids solution of a butylated melamine-formaldehyde condensate in a 1:1 xylene/butanol mixture, and the 11.4% maleinized adduct of Part B of this Example II (II B) at Resimene 891 resin solids loadings of 15 and 30% based upon the total resin solids. Prepare two formulations as follows:

|  | 15% | 30% |
|---|---|---|
| Resimene 891, grams | 15.0 | 30.0 |
| Adduct (II B), grams | 52.4 | 43.2 |
| Catalyst,* grams | 0.05 | 0.05 |
| Xylol, grams | 20.6 | 14.8 |

*Catalyst is butyl acid phosphate.

Both formulations are individually cast on a series of stainless steel plates and on glass plates in film of about 0.006 inch thickness and dried in a hot air oven for 30 minutes at 350° F. with the following results:

|  | 15% | 30% |
|---|---|---|
| Adhesion | Excellent | Excellent. |
| Flexibility | do | Do. |
| Chemical resistance (xylol) | do | Do. |
| Cross-linking | do | Do. |
| Clarity | Clear | Clear. |
| Gloss | Very high | Very high. |
| Yellowness | Slight | Slight. |

Part D

Preparation of pigmented formulations of Resimene 891, as described above, and the 11.4% maleinized adduct of Part B of the Example II (II B) at Resimene 891 resin solids loadings of 15 and 30% based the total resin solids. A pigmented Resimene 891 paste is prepared by intimately dispersing 250 parts of a finely ground rutile titanium dioxide in 90 parts of Resimene 891. Prepare two formulations as follows:

|  | 15% Pigm. | 30% Pigm. |
|---|---|---|
| Pigmented Resimene 891 paste, grams | 34.0 | 43.0 |
| Adduct (II B), grams | 31.5 | 25.9 |
| Xylene, grams | 31.5 | 28.1 |
| Butyl acid phosphate, grams | 0.04 | 0.04 |

Both formulations are individually cast on a series of cold rolled mild steel plates in films of about 0.006 inch thickness and dried in a hot air oven for 30 minutes at temperatures of 250 and 350° F. with the following results:

|  | 15% Pigmented | | 30% Pigmented | |
|---|---|---|---|---|
|  | 250° F. | 350° F. | 250° F. | 350° F. |
| Adhesion | E | E | E | E |
| Flexibility | E | E | E | VG |
| Chemical resistance (xylol) | F | VG | G | E |
| Cross-linking | G | VG | VG | E |
| Pencil hardness | 6B | 2B | 2B | HB |
| Reverse impact at— | | | | |
| 10 in. lbs | NE | NE | NE | VFC |
| 28 in. lbs | NE | VFC | NE | VFC |
| 40 in. lbs | NE | VFC | VFC | FC |
| Gloss | H | H | E | E |

LEGEND.—E=Excellent.  F=Fair.  G=Good.  NE=No Effect  H=High.  VG=Very Good.  VFC=Very Fine Crack.  FC=Fine Crack.

As can be seen from the properties reported above for the clear and the pigmented formulations of Parts C and D, respectively, of this Example II, the 11.4% maleinized adduct of the oleic ester of styrene/allyl alcohol copolymer combines with Resimene 891 to provide excellent surface coatings. The above pencil hardness test reports the hardest pencil on a scale of 6B through 9H which will not mar the film on scratching; with a rating of H being acceptable for appliance finishes. The reverse impact test drops a weight on the inverted steel panel (film surface downward) at forces of 10, 28 and 40 inch pounds.

EXAMPLE III

Part A

Preparation of oleic ester of styrene/allyl alcohol copolymer: Repeat Part A of Example II.

Part B

Preparation of maleinized adduct of the oleic ester of Part A of this Example III: Repeat Part B of Example II using 76 grams of maleic anhydride and 1045 grams of the product of Part A of this Example III in place of the quantities employed in Example II. The resulting 96% solids solution is then adjusted with xylol to about 80% solids. Analysis shows that the adduct contains about 6.8% by weight of actually adducted maleic anhydride based upon the total solids, and has a free acid content of about 0.269 meq./gram.

Part C

Preparation of clear formulations of Resimene 891, as above described, and the 6.8% maleinized adduct of Part B of this Example III (III B) at Resimene 891 resin solids loadings of 15 and 30% based upon the total resin solids. Prepare two formulations as follows:

|  | 15% | 30% |
|---|---|---|
| Resimene 891, grams | 15.0 | 30.0 |
| Adduct (III B), grams | 52.4 | 43.2 |
| Xylol, grams | 20.6 | 14.8 |
| Catalyst,* grams | 0.05 | 0.05 |

*Catalyst is butyl acid phosphate.

Both formulations are individually cast on a series of stainless steel plates and on glass plates in films of about 0.006 inch thickness and dried in a hot air oven for 30 minutes at 350° F. with the following results:

|  | 15% | 30% |
|---|---|---|
| Adhesion | Excellent | Excellent. |
| Flexibility | do | Do. |
| Chemical resistance (xylol) | Very good | Do. |
| Cross-linking | Excellent | Do. |
| Clarity | Clear | Clear. |
| Gloss | Very high | Very high. |
| Yellowness | Slight | Slight. |

Part D

Preparation of pigmented formulations of Resimene 891, as described above, and the 6.8% maleinized adduct of Part B of this Example III (III B) at Resimene 891 resin solids loadings of 15 and 30% based upon the total resin solids. Prepare two formulations as follows using the pigmented Resimene 891 paste prepared in Part D of Example II:

|  | 15% Pigm. | 30% Pigm. |
|---|---|---|
| Pigmented Resimene 891, grams | 34.0 | 43.0 |
| Adducts (III B), grams | 31.5 | 25.9 |
| Xylene, grams | 31.5 | 28.1 |
| Butyl acid phosphate, grams | 0.04 | 0.04 |

Both formulations are individually cast on a series of cold rolled mild steel plates in films of about 0.006 inch thickness and dried in a hot air oven for 30 minutes at temperatures of 250 and 350° F. with the following results:

|  | 15% Pigmented | | 30% Pigmented | |
|---|---|---|---|---|
|  | 250° F. | 350° F. | 250° F. | 350° F. |
| Adhesion | E | E | E | E |
| Flexibility | E | E | E | E |
| Chemical resistance (xylol) | F | G | F | G |
| Cross-linking | G | VG | G | VG |
| Pencil hardness | 6B | 3B | 6B | B |
| Reverse impact at— |  |  |  |  |
| 10 in. lbs | NE | NE | NE | NE |
| 28 in. lbs | NE | NE | VFC | VFC |
| 40 in. bls | NE | NE | VFC | VFC |
| Gloss | E | E | E | E |

LEGEND.—E=Excellent. F=Fair. G=Good. NE=No effect. VG=Very Good. FC=Fine Crack. VFC=Very Fine Crack.

As can be seen from the properties reported above for the clear and the pigmented formulations of Parts C and D, respectively, of this Example III, the 6.8% maleinized adduct of the oleic ester of styrene/allyl alcohol copolymer combines with Resimene 891 to provide excellent surface coatings. The pencil hardness test and the reverse impact test are carried out as described in Example II.

EXAMPLE IV

Part A

Preparation of oleic ester of styrene/allyl alcohol copolymer: Repeat Part A of Example II.

Part B

Preparation of maleinized adduct of the oleic ester of Part A of this Example IV: Repeat Part B of Example II using 38 grams of maleic anhydride and 1058 grams of the product of Part A of this Example IV in place of the quantities employed in Example II. The resulting 95% solids solution is then adjusted with xylol to about 80% solids. Analysis shows that the adduct contains about 3.8% by weight of actually adducted maleic anhydride based upon the total solids, and has a free acid content of about 0.267 meq./gram.

Part C

Preparation of clear formulation of Resimene 891, as above described, and the 3.8% maleinized adduct of Part B of this Example IV (IV B) at Resimene 891 resin solids loadings of 15 and 30% based upon the total resin solids. Prepare two formulations as follows:

|  | 15% | 30% |
|---|---|---|
| Resimene 891, grams | 15.0 | 30.0 |
| Adduct (IV B), grams | 51.0 | 41.9 |
| Xylol, grams | 22.0 | 16.0 |
| Catalyst,* grams | 0.05 | 0.05 |

*Catalyst is butyl acid phosphate.

Both formulations are individually cast on a series of stainless steel plates and on glass plates in films of about 0.006 inch thickness and dried in a hot air oven for 30 minutes at 350° F. with the following results:

|  | 15% | 30% |
|---|---|---|
| Adhesion | Excellent | Excellent. |
| Flexibility | do | Do. |
| Chemical Resistance (xylol) | Good | Very good. |
| Cross-linking | Very good | Excellent. |
| Clarity | Clear | Clear. |
| Gloss | Excellent | Excellent. |
| Yellowness | Very slight | Very slight. |

Part D

Preparation of pigmented formulations of Resimene 891, as described above and the 3.8% maleinized adduct of Part B of this Example IV (IV B) at Resimene 891 resin solids loadings of 15 and 30% based upon the total resin solids. Prepare two formulations as follows using the pigmented Resimene 891 paste prepared in Part D of Example II:

|  | 15% Pigm. | 30% Pigm. |
|---|---|---|
| Pigmented Resimene 891 paste, grams | 34.0 | 43.0 |
| Adduct (IV B), grams | 30.5 | 25.2 |
| Xylene, grams | 32.5 | 28.8 |
| Butyl acid phosphate, grams | 0.04 | 0.04 |

Both formulations are individually cast on a series of cold rolled mild steel plates in films of about 0.006 inch thickness and dried in a hot air oven for 30 minutes at temperatures of 250 and 350° F. with the following results:

|  | 15% pigmented | | 30% pigmented | |
|---|---|---|---|---|
|  | 250° F. | 350° F. | 250° F. | 350° F |
| Adhesion | E | E | E | E |
| Flexibility | E | E | E | E |
| Chemical resistance (xylol) | F | G | F | G |
| Cross-linking | G | VG | G | VG |
| Pencil hardness | 6B | 4B | 6B | 3B |
| Reverse impact at— |  |  |  |  |
| 10 in. lbs | NE | NE | NE | NE |
| 28 in. lbs | NE | NE | NE | VFC |
| 40 in. lbs | NE | NE | VFC | VFC |
| Gloss | E | E | E | E |

LEGEND.—E=Excellent. F=Fair. G=Good. VG=Very Good. VFC=Very Fine Crack. NE=No Effect.

As can be seen from the properties reported above for the clear and the pigmented formulations of Parts C and D, respectively, of this Example IV, the 3.8% maleinized adduct of the oleic ester of styrene/allyl alcohol copolymer combines with Resimene 891 to provide excellent surface coatings. The pencil hardness test and the reverse impact test are carried out as described in Example II.

The following Example V illustrates the formulation of a hard surface coating composition adapted for use as an appliance finish.

EXAMPLE V

Part A

Preparation of a soya fatty acid ester of a styrene-allyl alcohol copolymer containing about 52% by weight, based upon total solids, of soya fatty acids: Charge 6080 grams of water white soya fatty acids comprising, by weight approximately 8% linoleic acid, 8% linolenic acid, 26% oleic acid and 14% miscellaneous saturated acids, 5700 grams of a styrene-allyl alcohol copolymer containing about 5.8 weight percent of hydroxyl groups and 400 grams of xylol to a reaction kettle equipped with a stirrer and a trap-condenser-azeotrope set-up. The reaction mixture is heated according to the following schedule:

| Minutes: | Temp., °C. | Comments |
| --- | --- | --- |
| 0 | 27 | All ingredients charged. |
| 78 | 145 | Azeotrope starts. |
| 108 | 170 | 98 ml. water over. |
| 138 | 188 | 187 ml. water over. |
| 168 | 205 | 257 ml. water over. |
| 228 | 232 | 332 ml. water over. |
| 258 | 240 | 351 ml. water over. |
| 318 | 251 | 373 ml. water over. |
| 378 | 253 | 382 ml. water over. |
| 438 | 253 | 385 ml. water over, finis. |

A total of about 42.5 grams of xylol are removed with the water. The resulting product contains 97% esterified solids by weight, the acid number thereof being 16.5 as determined by Federal Test Method TT–P–1416 Method 5071.

Part B

Preparation of a maleinized adduct of the soya ester prepared in Part A of this example: Charge 1030 grams of the product of Part A of this example and 82.5 grams of maleic anhydride to a two-liter flask equipped with a stirrer and reflux condenser. Subsequently 1.0 gram of iodine predispersed in 10 ml. of xylol is added to the reaction mixture according to the following schedule:

| Minutes: | Temp., °C. | Comments |
| --- | --- | --- |
| 0 | 25 | Ester and maleic anhydride. |
| 15 | 100 | Charge iodine dispersion. |
| 35 | 225 | Some sublimation occurs. |
| 110 | 223 | |
| 140 | 225 | |
| 200 | 228 | Finis. |

The reaction mixture is cooled to about 100° C., 240 grams of butyl Cellosolve are added and the resulting 80% solids solution is strained through nylon cloth. Analysis shows that about 98.9% of the maleic anhydride charged is adducted to the ester showing the adduct to contain about 8% maleic solids by weight, based upon the initial ester solids.

Part C

Preparation of pigmented formulations of Resimene 891, as described above, and the 8% maleinized adduct of Part B of this Example V (V B) at Resimene 891 resin solids loadings of 15 and 30% based upon the total resin solids. Prepare two formulations as follows using the pigmented Resimene 891 paste prepared in Part D of Example II. No catalyst is used.

| | 15% Pigm. | 30% Pigm. |
| --- | --- | --- |
| Pigmented Resimene 891 paste, grams | 34.0 | 43.0 |
| Adduct (V B), grams | 26.5 | 22.3 |
| Xylene, grams | 30.2 | 32.0 |

Both formulations are individually cast on a series of cold rolled mild steel plates in films of about 0.006 inch thickness and dried in a hot air oven for 30 minutes at temperatures of 250 and 350° F. with the following results:

| | 15% pigmented | | 30% pigmented | |
| --- | --- | --- | --- | --- |
| | 250° F. | 350° F. | 250° F. | 350° F. |
| Adhesion | E | E | E | E |
| Flexibility | E | E | E | E |
| Chemical resistance (xylol) | G | VG | G | VG |
| Cross-linking | VG | E | VG | E |
| Pencil hardness | 3B | HB | 3B | H |
| Reverse impact at— | | | | |
| 10 in. lbs | NE | NE | NE | VFC |
| 28 in. lbs | VFC | VFC | VFC | VFC |
| 40 in. lbs | VFC | VFC | VFC | FC |
| Gloss | E | E | E | E |
| Yellowness | None | Moderate | None | Slight |

LEGEND.—E=Excellent. G=Good. VG=Very Good. NE=No Effect. VFC=Very Fine Crack. FC=Fine Crack.

As can be seen from the properties reported above, the 8% maleinized adduct of the soya ester of styrene/allyl alcohol copolymer combines with Resimene 891, even without catalyst, to provide excellent hard cross-linked surface coatings. The pencil hardness achieves appliance grade levels. Both the pencil hardness test and the reverse impact test are carried out as described in Example II.

One of the primary resinous components employed in the practice of this invention are adducts of (a) alpha, beta-ethylenically unsaturated carboxylic compounds and
(b) esters of
   (1) at least one unsaturated acid selected from the group consisting of fatty acids, rosin acids and mixtures thereof, and
   (2) a copolymer of a styrene monomer selected from the group consisting of styrene, alpha-alkyl styrenes, ring-substituted styrenes, alpha-alkyl ring-substituted alkyl styrenes, halostyrenes, haloalkyl styrenes and mixtures thereof and an allyl alcohol monomer selected from the group consisting of allyl alcohol, methallyl alcohol, chlorallyl alcohol and mixtures thereof.

The styrene/allyl alcohol copolymer will, in actual practice, most probably be a copolymer of styrene and allyl alcohol due to the ready availability of these monomers. However, it has been found that the styrene moiety present in the copolymers employed in the examples may be replaced, with equivalent results being obtained, by substituted styrenes such as, for example, alpha-alkyl styrenes, e.g., alpha-methyl styrene, alpha-ethyl styrene, etc.; ring-substituted alkyl styrenes, e.g., ortho-, meta- and para-methyl-ethyl, butyl, etc., styrenes, 2,3- and 2,4-dimethyl and diethyl styrenes; halo styrenes, e.g., mono-, di- and tri-chloro-styrenes, alpha-chloro styrene, 2,4-dibromostyrene, etc.; haloalkyl styrenes, e.g., 4-chloro-alpha-methyl styrene, 2-bromo-4-methyl styrene, etc. Mixtures of such styrene monomers may be present in combined form in the copolymer employed, if desired. Similarly, the allyl alcohol moiety present in the copolymers employed in the examples may be replaced, with equivalent results being obtained by substituted allyl alcohols such as, for example, methallyl and chlorallyl alcohols. Mixtures of such allylic monomers may be present in combined form in the copolymers employed, if desired.

While the prior art, as exemplified by U.S. Patents 2,588,890, 2,630,430, 2,894,938 and 2,940,946 quite adequately describes these styrene/allyl alcohol copolymers and methods for their preparation, in a preferred embodiment copolymers containing from about 5.0 to 8.0 weight percent of hydroxyl groups have been found to provide superior results and are employed. In a further preferred embodiment, the relatively homogenous copolymers prepared as taught in U.S. Patent 2,940,946 are employed.

The fatty acids or rosin acids with which the styrene/allyl alchol copolymer are esterified preferably have an unsaturation, as measured by iodine number using the ASTM D1467–57T method, of from about 50 to 220 and, more preferably, about 125 to 200. Thus, whether the acid employed be a relatively pure unsaturated acid or a mixture of acids such as are commercially available, e.g., derived from natural vegetable, protein or animal oils, the total acids employed would have an iodine number as above limited. It is, therefore, apparent that virtually any saturated or unsaturated rosin acid, e.g., abietic acid, fatty acid or commercial mixture of fatty acids and/or rosin acids may be employed with the sole proviso that if the mass chosen does not have an iodine number within the designated range, or of a predetermined desired value, a sufficient proportion of compensating acid should be added to adjust the iodine number to the desired level.

In a preferred embodiment, fatty acids are employed. Still more preferably, the proportions of saturated fatty acids and of conjugated unsaturated fatty acids in the total fatty acid employed are kept below 35 weight percent of each; the best results being obtained maintaining the proportion of saturated and conjugated unsaturated fatty acids below 10 weight percent of each type. In this embodiment, non-fatty monobasic acids such as, for example, rosin acids, benzoic acids, etc., may be substituted for fatty acids in proportions not exceeding 20% of the total acids used.

Within the foregoing frame of reference, it is therefore obvious that one may employ unsaturated fatty acids such as, for example, $\Delta^{9,10}$-decylenic acid, $\Delta^{9,10}$-dodecylenic acid, palmitoleic acid, oleic acid, recinoleic acid, petroselenic acid, vaccenic acid, linoleic acid, linolenic acid, eleostearic acid, licanic acid, parinaric acid, tariric acid, gadoleic acid, arachidonic acid, cetoleic acid, erucic acid, selacholeic acid, etc., mixtures of unsaturated fatty acids as obtained by the hydrolysis of drying and semi-drying oils such as, for example, acorn oil, beechnut oil, brazil nut oil, chaulmoogra oil, corn oil, cottonseed oil, croton oil, hemp seed oil, linseed oil, oiticia oil, perilla oil, poppyseed oil, sesame oil, soybean oil, safflower oil, sunflower oil, tall oil, tung oil, menhaden oil, sardine oil, walnut oil, dehydrated castor oil, etc.; saturated fatty acids such as, for example, capric acid, lauric acid, myristic acid, palmitic acid, stearic acid, arachidic acid, benhenic lignoceric acid, etc.; and mixtures of saturated fatty acids as obtained by the hydrolysis of non-drying oils such as, for example, coconut oil, babassu oil, palm oil, olive oil, castor oil, peanut oil, rape oil, etc.

Finally, with regard to the characterization of the fatty or rosin acid esters of styrene/allyl alcohol copolymers which may be employed, it has been found that the presence of more than a small amount of free hydroxyl groups in the esterified copolymer interferes with proper adduction of the unsaturated carboxylic acid, resulting in a competing esterification reaction with said carboxylic acid and in premature gelation of the reaction system. On the other hand, the presence of significant amounts of free fatty or rosin acid in the final adducted product has been found to cause foaming and form interfering concentrations of soap during the subsequent formulation of, e.g., water-based, surface coating compositions. Therefore it has been found that from about 0.75 to 1.25, and more preferably from about 0.95 to 1.1, carboxyl equivalents of fatty or rosin acid should be employed per hydroxyl equivalent of the styrene/allyl alcohol copolymer. When linseed acids, soya acids or other fatty acids of substantially equivalent acid number are used in conjunction with a styrene/allyl alcohol copolymer containing about 5.0 to 8.0 weight percent hydroxyl groups, esters prepared using about 38 to 62 weight percent of styrene/allyl alcohol copolymer have been found to eventuate in superior surface coating compositions.

During the preparation of the fatty or rosin acid esters of the styrene/allyl alcohol copolymers, a small amount of a hydrocarbon solvent is usually employed to maintain a flowable reaction system. In many instances, substantially more solvent may be employed without seriously affecting the practice of this invention. In commercial practice, it is most probable that the fabricator of the surface coating compositions will prepare his own fatty acid esters and then form the adduct as hereinafter taught. However, the inventive concept of this invention permits that one may obtain and use commercially available, e.g., fatty acid esters of styrene/allyl alcohol copolymers meeting the foregoing requirements as the raw material of this process.

Any ethylenically unsaturated carboxylic acid, anhydride, or a partial ester thereof containing the structure

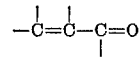

may be employed in forming the adducts. Anhydrides are preferably employed. However, to avoid redundancy the term "acid" as hereinafter employed in naming specific examples of useful compounds and in otherwise referring to these compounds shall be understood to include and refer to the corresponding anhydride where possible as well as to the partial esters. Thus, in place of the maleic acid employed in the examples, one may employ, with equivalent results, monocarboxylic acids. such as, for example, acrylic acid, methacrylic acid, crotonic acid, isocrotonic acid, vinyl acetic acid, ethacrylic acid, dimethyl acrylic acid, teracyclic acid angelic acid, tiglic acid, etc., and polycarboxylic acids such as, for example, itaconic acid, citraconic acid, chloramaleic acid, mesaconic acid, aconitic acid, etc.

As aforesaid, in the case of polycarboxylic acids, the partial, e.g., not exceeding one-half, esters thereof with 1–10 carbon atom alcohols may be employed. Examples thereof include monomethyl maleate, mono-butyl fumarate, mono-butyl maleate, mono-decylmaleate, monobenzyl maleate, etc.

In preparing the adducts, up to a stoichiometric proportion of the ethylenically unsaturated carboxylic acid with respect to the esterified styrene/allyl alcohol copolymer is employed, equating the unsaturation in the esterified copolymer as measured by the total iodine number thereof, using in this instance ASTM DI541–59T, with the unsaturation in the ethylenically unsaturated carboxylic acid. Although not limiting, it is preferred to adduct at least 90% of the fatty acid unsaturation. Again although not limiting, it has been observed that best cross-linking with the alkylated melaminealdehyde condensate and particularly good results are obtained when the adduct contains from about 3.5 to 13 weight percent of the alpha, beta-ethylenically unsaturated carboxylic compound, on an adduct solids basis, with better shelf life being obtained near the higher end of this range.

The esterified styrene/allyl alcohol copolymer and the ethylenically unsaturated carboxylic acid are combined in a suitable reaction vessel, preferably equipped with a reflux condenser and means for charging materials during reaction. Adduction is effected at temperatures of from about 50° C. to reflux, and more preferably at from about 100° C. to reflux, until the desired proportion of the ethylenically unsaturated carboxylic compound has been consumed. The presence of an organic solvent during adduction does not interfere except insofar as the particular solvent employed may not, at the reaction pressure employed, permit the reaction temperature to approach reaction conditions or maintain the reactive materials in a physical state permitting effective co-reaction.

Although not necessary, it has been found advantageous to effect the adduction in the presence of a small proportion of iodine; for example, up to about 2 weight percent, based upon the total weight of esterified styrene/allyl alcohol copolymer and ethylenically unsaturated carboxylic acid. The function of the iodine during adduction is to lighten the color of the resulting product and also to depress the molecular weight of the product so as to retain a lower viscosity and avoid gelation. This function is unusual in this art since the normal use of iodine is to catalyze reaction with conjugated unsaturation. In these systems, however, there may be very little, if any, conjugation. Thus, while no iodine need be employed, it has been found that the adducted product contains a level of color which may be found to be objectionable in certain instances. More importantly, however, when iodine is not used, the adduction reaction should be more carefully controlled so as to avoid gelation. The use of too much iodine, on the other hand, has been found to decrease the chemical, or hydrolysis, resistance of films prepared from the adducted product. Generally, the iodine is predispersed in a solvent and charged to the reaction system along with the ethylenically unsaturated carboxylic acid, but may be added during the adduction reaction, if desired, with some sacrifice in efficacy.

As heretofore mentioned, the adduction reaction may be effected in the optional presence of a non-reactive organic solvent. Generally, up to 10% by weight, based upon total solids, of an organic solvent will provide a suitable reaction mixture. However, as aforesaid, significantly more solvent may be employed if desired. Virtually any of the conventional non-reactive solvents, e.g., Varsol, xylol, toluene, isobutyl ketone, etc., may be employed.

The alkylated melamine-aldehyde condensates employed in the practice of this invention are the condensation products of melamine with an aldehyde, alkylated with an alkanol of from 1 to 6 carbon atoms such as methanol, ethanol, n-propanol, isopropanol, n-butanol, isobutanol, amylalcohol, hexanol, ethyl butanol, etc. Aldehydes which may be used include formaldehyde, acetaldehyde, crotonic aldehyde, acrolein, benzaldehyde, furfural, etc. While there are but from 1 to 6 positions in the melamine structure which can be reacted with aldehyde, it has been found that from 1 to 20 molar proportions of aldehyde per molar proportion of melamine can be charged to the reactor, the product being a mixture of melamine condensates. Most commercial melamine resins are produced this way. Similarly from 1 to 25 molar proportions of the alkanol may be employed per molar proportion of melamine. Such alkylated melamine-aldehyde condensates are well-known to the art. A representative teaching thereof and of their preparation is found in U.S. Patent 2,197,357.

The compositions of this invention are solutions of mixtures of the adduct and the alkylated melamine-aldehyde condensate in solvents of the nature discussed with regard to the adduct. Preferably they are used in solutions of from 20 to about 80 weight percent resins solids depending on the viscosity desired. On cure under heat they become thermoset resins possessing a high degree of flexibility. Thus, these are usually cast and then cured into their final shape or form. They may be applied in conventional manner, e.g., spraying, brushing, dipping, film casting, rolling, etc., to any substrate for protective and/or decorative effect. Typical substrates include metals such as, e.g., steel, chromium, etc., wood, glass, ceramics, etc. They provide excellent film flexibility combined with outstanding chemical resistance to, e.g., solvents, detergents, alkali, etc.

Conventional and typical surface coating additives may be used in conjunction with the compositions of this invention. Such include pigments, plasticizers, solvents, driers and compatible polymers, both thermoplastic and thermosetting, which may be used to alter film properties or application.

It is obvious that many variations may be made in the products and processes set forth above without departing from the spirit and scope of this invention.

What is claimed is:
1. As a surface coating composition, a non-aqueous solution comprising, as resinous components,
  (A) an adduct of
    (1) from about 3.5 to about 13 weight percent, based upon the adduct solids, of maleic anhydride, and
    (2) an ester of
      (a) from about 0.75 to about 1.25 carboxyl equivalents of oleic acid and
      (b) one hydroxyl equivalent of a copolymer of styrene and allyl alcohol, said copolymer before esterification, having a hydroxyl group content of from about 5.0 to about 8.0 weight percent, and
  (B) a butylated melamine-formaldehyde condensate.

References Cited

UNITED STATES PATENTS

| | | | |
|---|---|---|---|
| 2,940,946 | 6/1960 | Shokal et al. | |
| 3,251,790 | 5/1966 | Christenson et al. | 260—18 |
| 3,287,295 | 11/1966 | Hahn | 260—22 |
| 3,308,077 | 3/1967 | Pattison et al. | 260—23 |
| 3,098,834 | 7/1963 | Jerabek | 260—22 |
| 3,196,117 | 7/1965 | Boller | 260—22 |
| 3,196,119 | 7/1965 | Boller et al. | 260—22 |
| 3,355,403 | 11/1967 | Hahn | 260—23 |

FOREIGN PATENTS 700,779  12/1964  Canada.

HOSEA E. TAYLOR, Jr., Primary Examiner

R. W. GRIFFIN, Assistant Examiner

U.S. Cl. X.R.

117—124, 132, 161; 260—23, 33.4, 33.6, 39, 41

UNITED STATES PATENT OFFICE
CERTIFICATE OF CORRECTION

Patent No. 3,480,574                      November 25, 1969

Frank J. Hahn et al.

It is certified that error appears in the above identified patent and that said Letters Patent are hereby corrected as shown below:

Column 2, line 7, "condenser-azotrope" should read -- condenserazeotrope --. Column 4, line 15, after "based" insert -- upon --.

Signed and sealed this 2nd day of June 1970.

(SEAL)
Attest:

Edward M. Fletcher, Jr.              WILLIAM E. SCHUYLER, JR.
Attesting Officer                    Commissioner of Patents